United States Patent
Yang et al.

(10) Patent No.: US 12,316,552 B2
(45) Date of Patent: May 27, 2025

(54) DATA BANDWIDTH MANAGEMENT METHOD AND DEVICE

(71) Applicant: MEDIATEK INC., Hsinchu (TW)

(72) Inventors: Tsung-Hsi Yang, Hsinchu (TW); Tzu-Wen Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 406 days.

(21) Appl. No.: 17/724,024

(22) Filed: Apr. 19, 2022

(65) Prior Publication Data

US 2023/0336498 A1    Oct. 19, 2023

(51) Int. Cl.
H04L 47/125 (2022.01)
H04L 47/76 (2022.01)

(52) U.S. Cl.
CPC ............ *H04L 47/76* (2013.01); *H04L 47/125* (2013.01)

(58) Field of Classification Search
CPC ... H04L 47/76; H04L 47/125; H04L 41/0896; H04W 28/26; H04W 72/0453
See application file for complete search history.

(56) References Cited

U.S. PATENT DOCUMENTS

| | | | |
|---|---|---|---|
| 10,531,436 B1 * | 1/2020 | Douglas | H04W 76/10 |
| 10,601,668 B2 * | 3/2020 | Ramesh | H04L 41/0896 |
| 11,240,825 B1 * | 2/2022 | Kumar | H04W 72/56 |
| 2010/0195611 A1 * | 8/2010 | Allen | H04W 28/20 370/329 |
| 2012/0120892 A1 * | 5/2012 | Freda | H04W 8/005 370/329 |
| 2014/0080535 A1 * | 3/2014 | Gauvreau | H04W 72/543 455/513 |
| 2014/0254548 A1 * | 9/2014 | Hughes | H04W 12/062 370/331 |
| 2019/0166067 A1 * | 5/2019 | Xu | H04L 47/70 |
| 2021/0021431 A1 * | 1/2021 | Guim Bernat | H04L 9/3247 |

FOREIGN PATENT DOCUMENTS

| | | |
|---|---|---|
| CN | 110690999 A | 1/2020 |
| CN | 111629355 A | 9/2020 |

OTHER PUBLICATIONS

Chinese language office action dated Mar. 31, 2023, issued in application No. TW 111121003.

* cited by examiner

*Primary Examiner* — Meng Vang
*Assistant Examiner* — Hector Reyes
(74) *Attorney, Agent, or Firm* — McClure, Qualey & Rodack, LLP (57) ABSTRACT

A data bandwidth management method is provided. The data bandwidth management method is applied to a data bandwidth management device. The bandwidth management method includes the steps of obtaining one or more data bandwidth sharing configurations corresponding to one or more sharing devices; receiving a service request of a client device connected to the data bandwidth management device; and allocating data bandwidth of the one or more sharing devices to the client device based on the one or more data bandwidth sharing configurations in response to the service request of the client device.

10 Claims, 6 Drawing Sheets

DATA BANDWIDTH MANAGEMENT METHOD AND DEVICE

BACKGROUND OF THE INVENTION

Field of the Invention

The invention generally relates to data bandwidth management technology, and more particularly, to a data bandwidth management technology in which the data bandwidth management device may allocate the data bandwidth of the client device based on the data bandwidth sharing configuration of the client device.

Description of the Related Art

When a client device within the service range of Customer-Premises Equipment (CPE) is accessing the Internet, the temporary data bandwidth requirement of the client device may be higher than the CPE's network, and the temporary data bandwidth requirement may be also higher than its own Subscriber Identity Module (SIM) capability. However, within the service range of the CPE, another client device with its own SIM may have unused bandwidth.

Therefore, how to efficiently allocate the total data bandwidth of the client devices of the CPE is worthy of discussion.

BRIEF SUMMARY OF THE INVENTION

A data bandwidth management methods and device are provided to overcome the problems mentioned above.

An embodiment of the invention provides a data bandwidth management method. The data bandwidth management method is applied to a data bandwidth management device. The data bandwidth management method includes the steps of obtaining one or more data bandwidth sharing configurations corresponding to one or more sharing devices; receiving a service request of a client device connected to the data bandwidth management device; and allocating data bandwidth of the one or more sharing devices to the client device based on the one or more data bandwidth sharing configurations in response to the service request of the client device.

An embodiment of the invention provides a data bandwidth management method. The data bandwidth management method is applied to a data bandwidth management device. The data bandwidth management method includes the steps of obtaining one or more data bandwidth sharing configurations corresponding to one or more sharing devices; receiving a service request of a client device connected to the data bandwidth management device; determining whether data bandwidth of the one or more sharing devices are congested; and inquiring a nearby device whether to agree to share its data bandwidth based on determination of the data bandwidth of the one or more sharing devices are congested.

An embodiment of the invention provides a data bandwidth management device. The data bandwidth management device includes a data bandwidth allocator The data bandwidth allocator obtains one or more data bandwidth sharing configurations corresponding to one or more sharing devices, receives a service request of a client device connected to the data bandwidth management device, and allocates data bandwidth of the one or more sharing devices to the client device based on the one or more data bandwidth sharing configurations in response to the service request of the client device.

Other aspects and features of the invention will become apparent to those with ordinary skill in the art upon review of the following descriptions of specific embodiments of the data bandwidth management methods and device.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
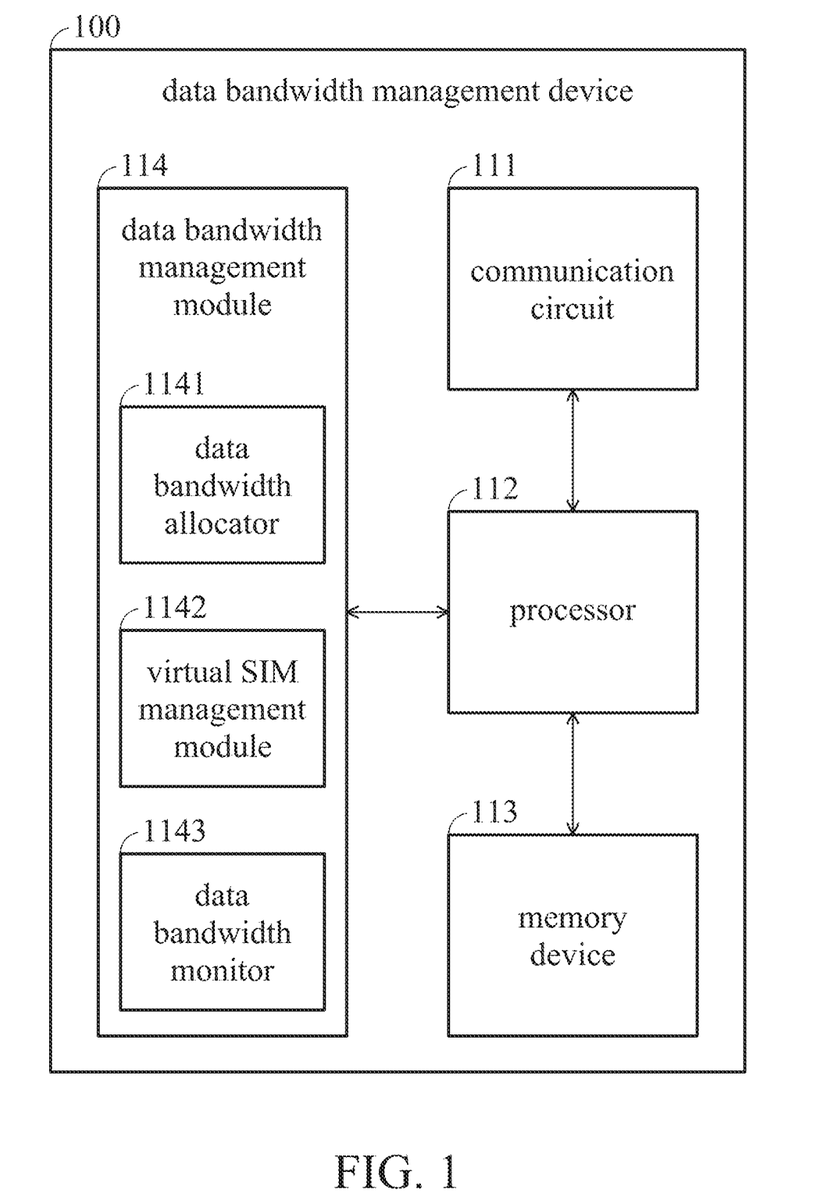
FIG. 1 is a block diagram of a data bandwidth management device 100 according to an embodiment of the invention.

FIG. 1 is a block diagram of a data bandwidth management device 100 according to an embodiment of the invention. As shown in FIG. 1, the data bandwidth management device 100 may include a communication circuit 111, a processor 112, a memory device 113 and a data bandwidth management module 114. It should be noted that in order to clarify the concept of the invention, FIG. 1 presents a simplified block diagram in which only the elements relevant to the invention are shown. However, the data bandwidth management device 100 should not be limited to what is shown in FIG. 1.

In the embodiments of the invention, the data bandwidth management device 100 may provide the internet connection to the client devices which are connected to the data bandwidth management device 100 through a wire network or a wireless network. The data bandwidth management device 100 may be a router or a Customer-Premises Equipment (CPE), but the invention should not be limited thereto.

In the embodiments of the invention, the communication circuit 111 may comprise different network interfaces, e.g. wire network interface or wireless network interface. The wire network interface may comprise the Ethernet interface, but the invention should not be limited thereto. The wireless network interface may comprise Wi-Fi interface or Bluetooth interface, but the invention should not be limited thereto. The data bandwidth management device 100 may be connected to the client devices through the communication circuit 111. The data bandwidth management device 100 may provide default data bandwidth which is from the default network (e.g. wire Wide Area Network (WAN) or cellular WAN) of the data bandwidth management device 100 to the client devices through the communication circuit 111. In addition, in the embodiments of the invention, the communication circuit 111 may further comprise a plurality of radio frequency (RF) modules. Each RF module may comprise a plurality antennas and each RF module may correspond to a virtual Subscriber Identity Module (SIM). In some embodiments, the RF modules may be integrated into single module which comprises a plurality of groups of antennas and each group of antennas may correspond to a virtual SIM. The communication circuit 111 may provide the data bandwidth corresponding to each virtual SIM through the RF module corresponding to each virtual SIM. However, in other embodiments, the data bandwidth management device 100 may not provide any default data bandwidth but only provides data bandwidth of one or more sharing devices to one or more client devices.

In the embodiments of the invention, the processor 112 may control the operations of the communication circuit 111, the memory device 113 and the data bandwidth management module 114. According to an embodiment of the invention, the processor 112 may also be arranged to execute the program codes of the software modules. The program codes accompanied by specific data in a data structure may also be referred to as a processor logic unit or a stack instance when being executed. Therefore, the processor 112 may be regarded as being comprised of a plurality of processor logic units, each for executing one or more specific functions or tasks of the corresponding software modules.

In the embodiments of the invention, the memory device 113 may store the software and firmware program codes, system data, user data, etc. of the data bandwidth management device 100. The memory device 113 may be a volatile memory such as a Random Access Memory (RAM); a non-volatile memory such as a flash memory or Read-Only Memory (ROM); a hard disk; or a combination thereof.

In the embodiments of the invention, the data bandwidth management module 114 may comprise a data bandwidth allocator 1141, a virtual SIM management module 1142, and a data bandwidth monitor 1143. The data bandwidth management module 114 can be implemented and configured by hardware, firmware, software, and any combination thereof. The data bandwidth management module 114, when executed by the processor 112 (e.g., via executing program codes stores in memory device 113), allow the data bandwidth management device 100 to perform embodiments of the present invention.

According to an embodiment of the invention, the data bandwidth allocator 1141 may obtain one or more data bandwidth sharing configurations corresponding to one or more sharing devices. The sharing device is a device which provides its data bandwidth sharing configuration to the data bandwidth management device 100. The sharing device can be a client device that is currently or has been connected to the data bandwidth management device 100. The sharing device can also be a device that has never been connected to the data bandwidth management device 100. When receiving a service request from a client device connected to the data bandwidth management device 100, the data bandwidth allocator 1141 may allocate bandwidth to the client device based on the one or more data bandwidth sharing configurations. Details for allocating bandwidth will be discussed below.

According to an embodiment of the invention, a data bandwidth sharing configuration of a sharing device may be set on the sharing device, and the data bandwidth management device 100 may obtain a data bandwidth sharing configuration of a sharing device through a wild area network (WAN), such as a cellular (4G/5G) network, or a local area network (LAN), such as a Wi-Fi network from the sharing device. In another embodiment, a data bandwidth sharing configuration of a sharing device may be directly set on the data bandwidth management device 100.

According to an embodiment of the invention, the default data bandwidth of the data bandwidth management device 100 may be allocated to the client devices first, and if a bandwidth congestion occurs on the default data bandwidth of the data bandwidth management device 100, a data bandwidth of a sharing device might be allocated to the client device. But the invention should not be limited to this allocation order. The data bandwidth allocator 1141 can adopt different allocation order.

According to an embodiment of the invention, the data bandwidth sharing configuration may indicate whether the sharing device agrees to share its data bandwidth to client devices connected to the data bandwidth management device 100. If the data bandwidth sharing configuration indicates the sharing device agrees to share its bandwidth, the virtual SIM management module 1142 may configure a virtual SIM with the SIM profile of the sharing device to establish a WAN. Then, if the data bandwidth management device 100 receives a service request from a client device, the data bandwidth allocator 1141 might allocate the data bandwidth of the sharing device to the client device. In one embodiment, before allocating a data bandwidth of a sharing device, the data bandwidth monitor 1143 would determine whether the data bandwidth of the sharing device is congested. If no bandwidth congestion occurs on the data bandwidth of the sharing device, the data bandwidth allocator 1141 would allocate the data bandwidth of the sharing device to the client device. If a bandwidth congestion occurs on the data bandwidth of the sharing device, the data bandwidth allocator 1141 would allocate data bandwidth of another sharing device to the client device.

According to an embodiment of the invention, if the data bandwidth management device 100 receives a service request from a client device, the data bandwidth allocator 1141 may try to allocate the data bandwidth of the client device based on the data bandwidth sharing configuration of the client device first. If the data bandwidth sharing configuration indicates that the client device does not agree to share its data bandwidth, or the data bandwidth sharing configuration indicates that the client device agrees to share its data bandwidth but a bandwidth congestion occurs on the data bandwidth of the client device, the data bandwidth allocator 1141 would allocate data bandwidth of the sharing devices to the client device.

According to another embodiment of the invention, the data bandwidth sharing configuration of the client device or the sharing device may further indicate the sharing priority of its own bandwidth, e.g. the sharing priority indicates that the client device or the sharing device has the highest priority for using its data bandwidth.

In an example, if a data bandwidth sharing configuration indicates that a sharing device agrees to share its data bandwidth and it has the highest priority to use its data bandwidth, when the data bandwidth monitor 1143 detects that the sharing device is using its data bandwidth, the data bandwidth allocator 1141 will not allocate the data bandwidth of the sharing device to the client device.

In another example, if a data bandwidth sharing configuration indicates that a sharing device agrees to share its data bandwidth and it has the highest priority to use its data bandwidth, when the data bandwidth allocator 1141 receives a service request from the sharing device but a client device is using the data bandwidth of the sharing device, the data bandwidth allocator 1141 may reduce the data bandwidth of the sharing device reserved to the client device, or even stop the client device from using the data bandwidth of the sharing device (i.e. terminate the data flow of the client device on the data bandwidth of the sharing device) and allocate the data bandwidth of the sharing device to itself. If the data bandwidth allocator 1141 stop the client device from using the data bandwidth of the sharing device, the data bandwidth allocator 1141 may allocate the data bandwidth of other data bandwidth, such as the default data bandwidth of the of the data bandwidth management device 100 or data bandwidth of other sharing devices, to the client device for the terminated data flow.

In another example, before reducing the data bandwidth of the sharing device reserved to the client device or stopping the client device from using the data bandwidth of the sharing device, the data bandwidth monitor 1143 may determine whether the data bandwidth of the sharing device is congested. If the data bandwidth of the sharing device is congested, the data bandwidth allocator 1141 reduces the data bandwidth of the sharing device reserved to the client device or stops the client device from using the data bandwidth of the sharing device. Otherwise, the data bandwidth allocator 1141 allocates the data bandwidth of the sharing device to itself and maintains that the client device uses the data bandwidth of the sharing device.

According to an embodiment, each virtual SIM may correspond to a Quality of Service (QoS) queue. If the sharing priority indicates that a sharing device agreeing to share its bandwidth has the highest priority to use its bandwidth, when the QoS queue corresponding to the data bandwidth of the sharing device has the data packet from the sharing device, it has the highest priority that the data bandwidth allocator 1141 may allocate the data bandwidth of the sharing device to itself.

According to an embodiment of the invention, the data bandwidth monitor 1143 may monitor whether the data bandwidth of one or more sharing devices which agrees to share its data bandwidth is congested. If the data bandwidth of one or more sharing devices which agrees to share its data bandwidth is congested, the data bandwidth monitor 1143 may send a message to a sharing device which does not agree to share its data bandwidth originally to inquire whether the sharing client device want to share its data bandwidth, or send a message to a nearby electrical device which is not currently connected to the data bandwidth management device 100 to inquire whether the electrical device want to share its data bandwidth.

Figure 2:
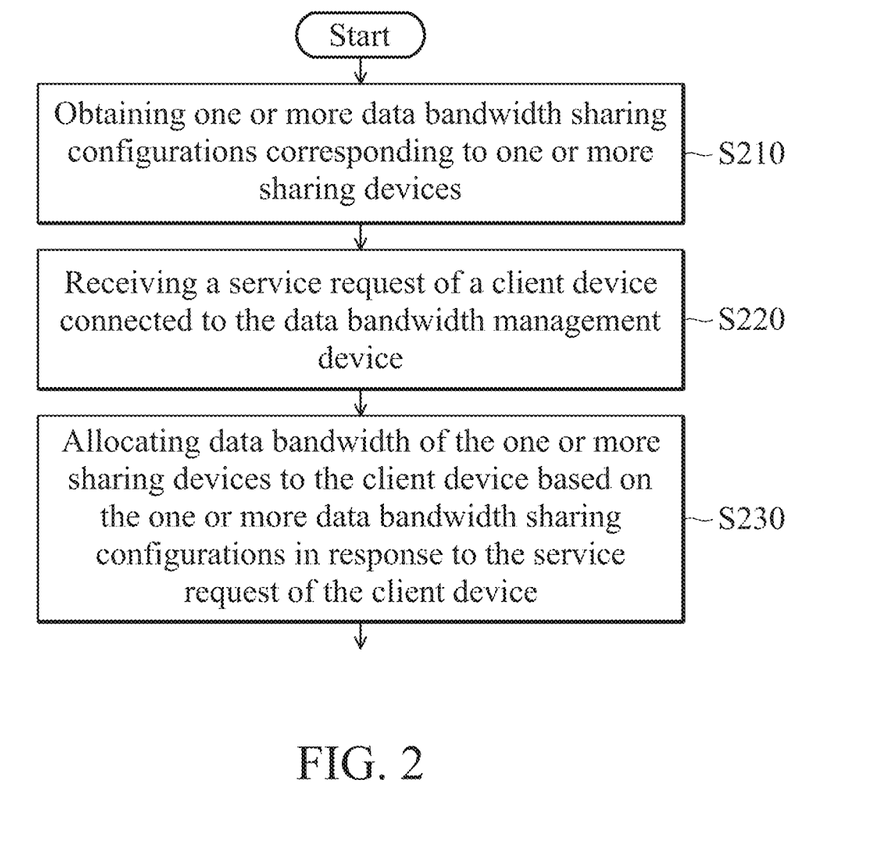
FIG. 2 is a flow chart illustrating a data bandwidth management method according to another embodiment of the invention.

FIG. 2 is a flow chart illustrating a data bandwidth management method according to an embodiment of the invention. The data bandwidth management method can be applied to the data bandwidth management device 100. As shown in FIG. 2, in step S210, the bandwidth management device 100 may obtain one or more data bandwidth sharing configurations corresponding to one or more sharing devices.

In step S220, the bandwidth management device 100 may receive a service request of a client device connected to the data bandwidth management device.

In step S230, the bandwidth management device 100 may allocate data bandwidth of the one or more sharing devices to the client device based on the one or more data bandwidth sharing configurations in response to the service request of the client device.

Figure 3:
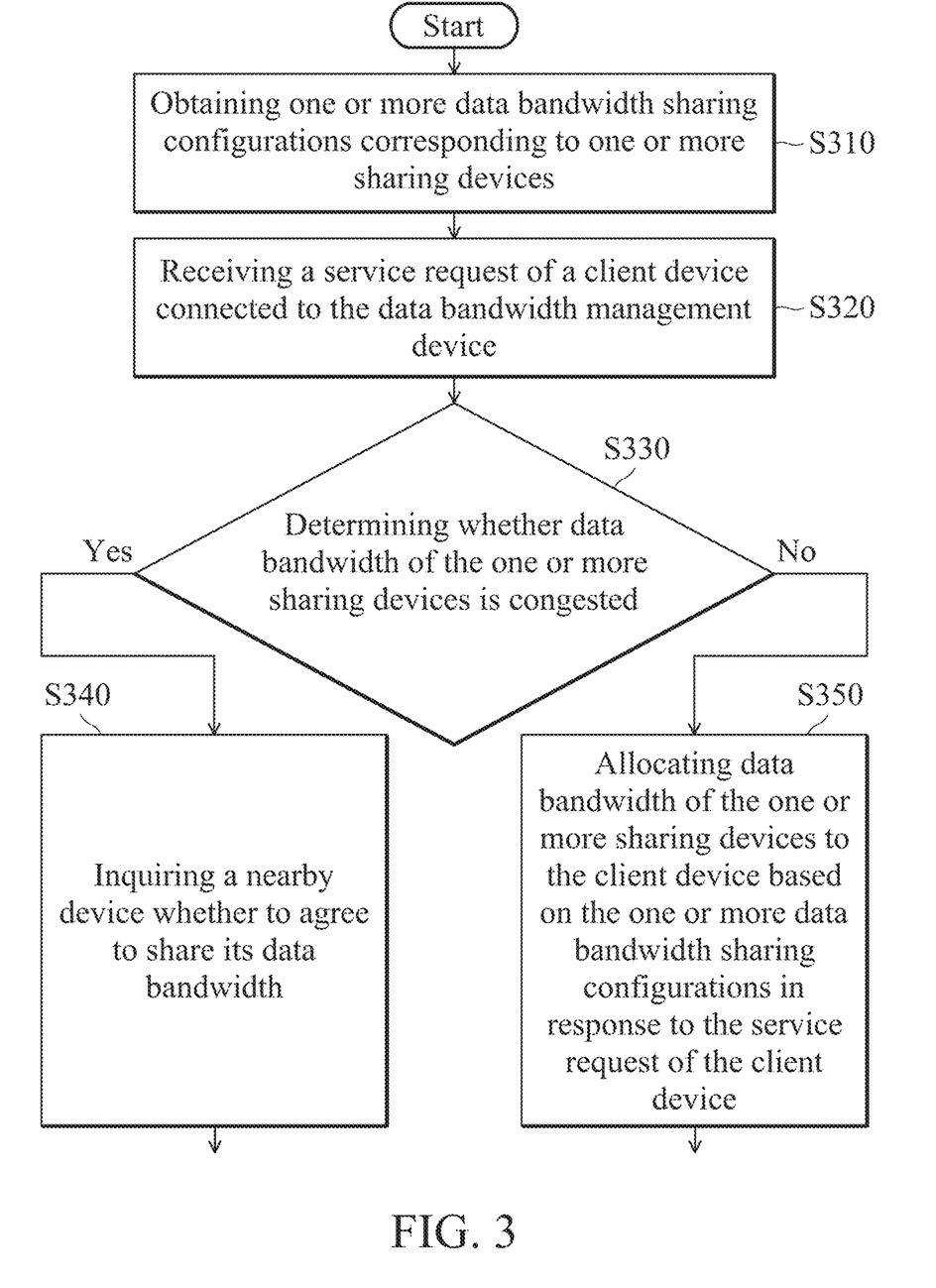
FIG. 3 is another flow chart illustrating a data bandwidth management method according to another embodiment of the invention.

FIG. 3 is a flow chart illustrating a data bandwidth management method according to another embodiment of the invention. The data bandwidth management method can be applied to the data bandwidth management device 100. As shown in FIG. 3, in step S310, the bandwidth management device 100 may obtain one or more data bandwidth sharing configurations corresponding to one or more sharing devices.

In step S320, the bandwidth management device 100 may receive a service request of a client device connected to the data bandwidth management device.

In step S330, the bandwidth management device 100 may determine whether data bandwidth of the one or more sharing devices is congested.

If data bandwidth of the one or more sharing devices is congested, step S340 is performed. In step S340, the bandwidth management device 100 may inquire a nearby device whether to agree to share its data bandwidth.

If data bandwidth of the one or more sharing devices is not congested, step S350 is performed. In step S350, the bandwidth management device 100 may allocate data bandwidth of the one or more sharing devices to the client device based on the one or more data bandwidth sharing configurations in response to the service request of the client device.

Figure 4A:
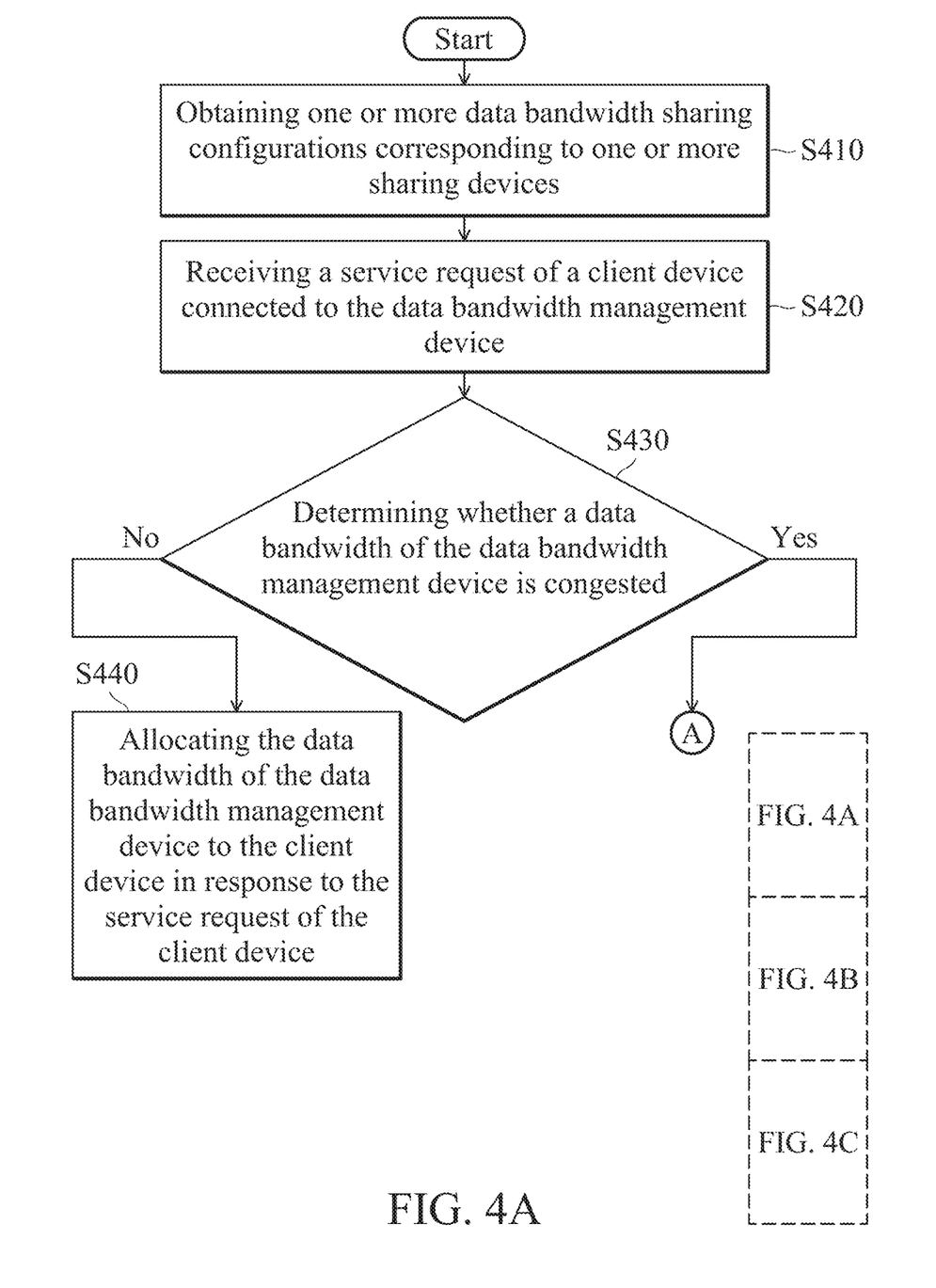
FIGS. 4A-4C is another flow chart illustrating a data bandwidth management method according to another embodiment of the invention.
Figure 4B:
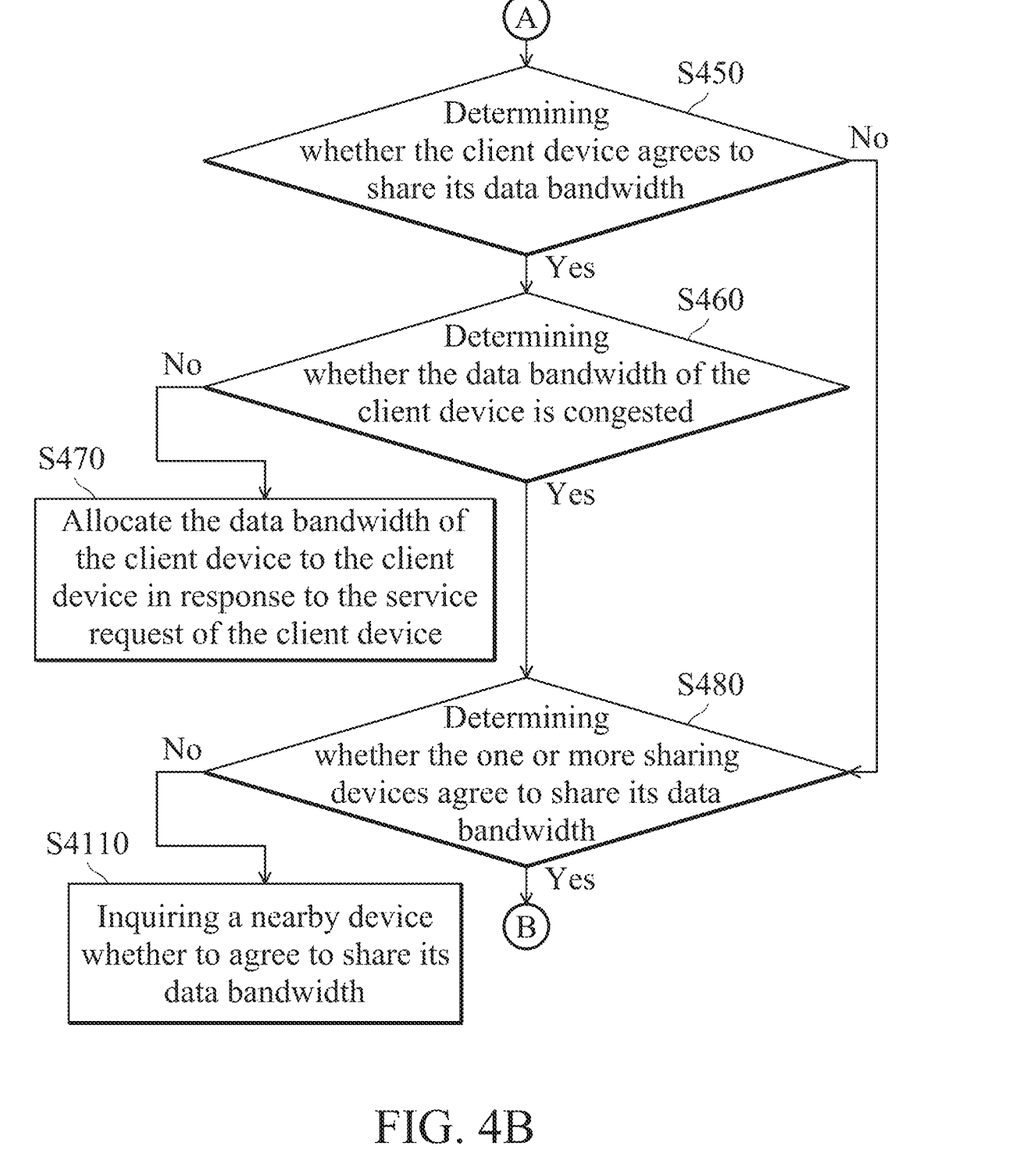
Figure 4C:
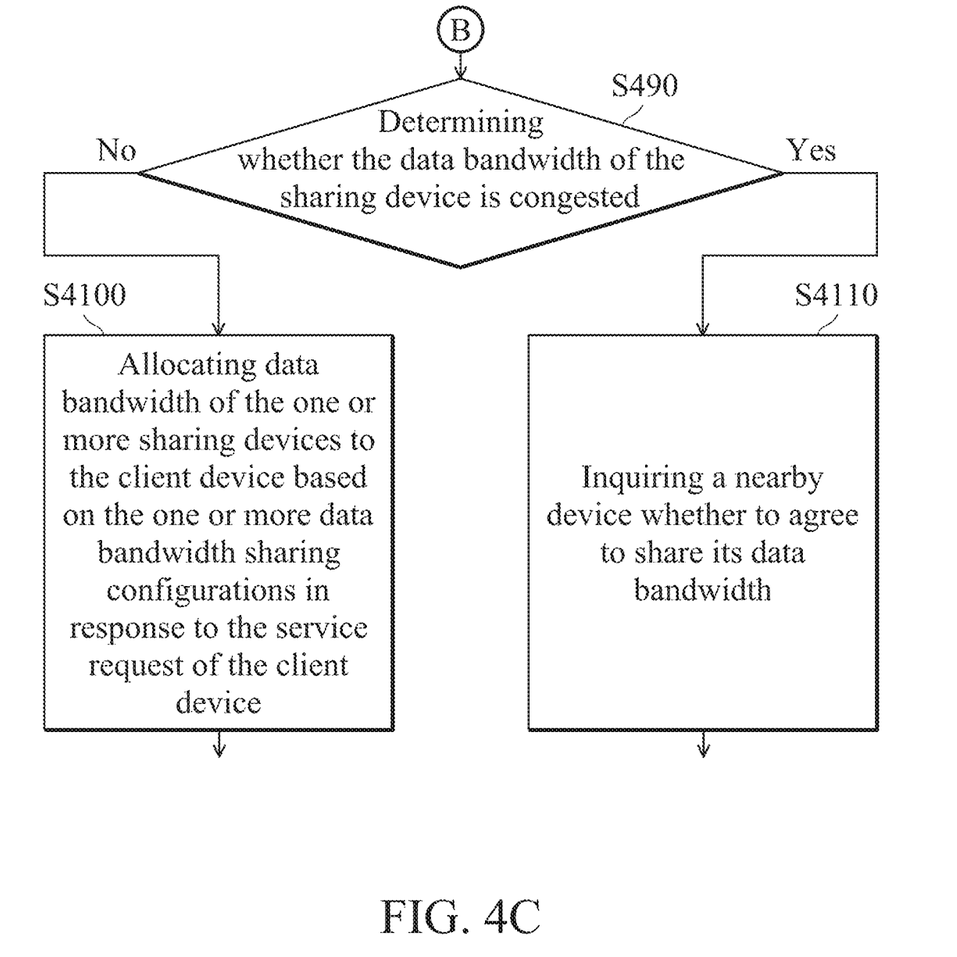

FIGS. 4A-4C is a flow chart illustrating a data bandwidth management method according to another embodiment of the invention. The data bandwidth management method can be applied to the data bandwidth management device 100. As shown in FIGS. 4A-4C, in step S410, the bandwidth management device 100 may obtain one or more data bandwidth sharing configurations corresponding to one or more sharing devices.

In step S420, the bandwidth management device 100 may receive a service request of a client device connected to the data bandwidth management device.

In step S430, the bandwidth management device 100 may determine whether a data bandwidth of the data bandwidth management device 100 is congested.

If the data bandwidth of the data bandwidth management device 100 is not congested, step S440 is performed. In step S440, the bandwidth management device 100 may allocate the data bandwidth of the data bandwidth management device 100 to the client device in response to the service request of the client device.

If the data bandwidth of the data bandwidth management device 100 is congested, step S450 is performed. In step S450, the bandwidth management device 100 may determine whether the client device agrees to share its data bandwidth.

If the client device agrees to share its data bandwidth, step S460 is performed. In step S460, the bandwidth management device 100 may determine whether the data bandwidth of the client device is congested.

If the data bandwidth of the client device is not congested, step S470 is performed. In step S470, the bandwidth management device 100 may allocate the data bandwidth of the client device to the client device in response to the service request of the client device.

If the data bandwidth of the client device is congested, step S480 is performed. In step S480, the bandwidth management device 100 may determine whether the one or more sharing devices agree to share its data bandwidth. If the client device does not agree to share its data bandwidth, step S480 is also performed.

If the one or more sharing devices agree to share its data bandwidth, step S490 is performed. In step S490, the bandwidth management device 100 may determine whether the data bandwidth of the sharing device is congested.

If the data bandwidth of the sharing device is not congested, step S4100 is performed. In step S4100, the bandwidth management device 100 may allocate data bandwidth of the one or more sharing devices to the client device based on the one or more data bandwidth sharing configurations in response to the service request of the client device.

If the data bandwidth of the sharing device is congested, step S4110 is performed. In step S4110, the bandwidth management device 100 may inquire a nearby device whether to agree to share its data bandwidth. If the one or more sharing devices do not agree to share its data bandwidth, step S4110 is also performed.

It should be noted that the flow chart of FIGS. 4A-4C is an embodiment of the invention, but the invention should not be limited to this allocation order shown in FIGS. 4A-4C.

In the bandwidth management methods provided in the invention, the bandwidth management device may allocate the bandwidth to each client device based on the bandwidth sharing configuration of each client device. Therefore, in the bandwidth management method provided in the invention, the bandwidth management device may allocate the total bandwidth of the client devices efficiently and more flexible.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data bandwidth management method, applied to a data bandwidth management device, comprising:
    obtaining one or more data bandwidth sharing configurations corresponding to one or more sharing devices;
    receiving a service request of a client device connected to the data bandwidth management device; and
    allocating data bandwidth of the one or more sharing devices to the client device based on the one or more data bandwidth sharing configurations in response to the service request of the client device, wherein the allocating includes configuring a virtual Subscriber Identity Module (SIM) of the data bandwidth management device with a SIM profile of a sharing device,
    wherein the step of allocating the data bandwidth of the one or more sharing devices includes:
    allocating data bandwidth of a sharing device to the client device based on a first data bandwidth sharing configuration of the one or more data bandwidth sharing configurations, wherein the first data bandwidth sharing configuration corresponds to the sharing device and indicates the sharing device agrees to share its data bandwidth,
    wherein the sharing device is different from the client device,
    wherein the step of allocating the data bandwidth of the sharing device to the client device includes:
    checking if a second data bandwidth sharing configuration of the one or more data bandwidth sharing configurations indicates the client device agrees to share its data bandwidth, wherein the second data bandwidth sharing configuration corresponds to the client device; and
    allocating the data bandwidth of the sharing device to the client device based on the second data bandwidth sharing configurations indicating the client device does not agree to share its data bandwidth.

2. The data bandwidth management method of claim 1, wherein the step of allocating the data bandwidth of the sharing device to the client device includes:
    determining if the data bandwidth of the sharing device is congested; and
    allocating the data bandwidth of the sharing device to the client device based on determination of the data bandwidth of the sharing device is not congested.

3. The data bandwidth management method of claim 1, wherein the first data bandwidth sharing configuration further indicates the sharing device has highest priority to use its data bandwidth, and the step of allocating data bandwidth of the sharing device to the client device further includes:

monitoring if the sharing device is using its data bandwidth; and allocating data bandwidth of the sharing device to the client device only when the sharing device is not using its data bandwidth.

4. The data bandwidth management method of claim 1, wherein the first data bandwidth sharing configuration further indicates the sharing device has highest priority to use its data bandwidth, and the method further comprises:

receiving a service request of the sharing device when the client device is using data bandwidth of the sharing device; and stopping the client device from using data bandwidth of the sharing device based on the reception of the service request of the sharing device.

5. The data bandwidth management method of claim 1, further comprises:

determining if a data bandwidth of the data bandwidth management device is congested;

wherein the step of allocating the data bandwidth of the one or more sharing devices to the client device includes:

allocating the data bandwidth of the one or more sharing devices to the client device based on determination of the data bandwidth of the data bandwidth management device is congested.

6. A data bandwidth management device, comprising:

a communication circuit, receiving one or more data bandwidth sharing configurations corresponding to one or more sharing devices from the one or more sharing devices;

a data bandwidth allocator;

a virtual Subscriber Identity Module (SIM) management module; and a processor, coupled to the communication circuit, the data bandwidth allocator and the virtual SIM management module such that, within operation, the processor performs operations comprising:

obtaining, via the data bandwidth allocator, one or more data bandwidth sharing configurations corresponding to one or more sharing devices, receiving a service request of a client device connected to the data bandwidth management device, and allocating data bandwidth of the one or more sharing devices to the client device based on the one or more data bandwidth sharing configurations in response to the service request of the client device, wherein the allocating includes configuring a virtual Subscriber Identity Module (SIM) of the data bandwidth management device with a SIM profile of a sharing device, wherein the data bandwidth allocator allocates data bandwidth of a sharing device to the client device based on a first data bandwidth sharing configuration of the one or more data bandwidth sharing configurations, wherein the first data bandwidth sharing configuration corresponds to the sharing device and indicates the sharing device agrees to share its data bandwidth, wherein the sharing device is different from the client device, wherein the data bandwidth allocator checks a second data bandwidth sharing configuration of the one or more data bandwidth sharing configurations indicates the client device agrees to share its data bandwidth, wherein the second data bandwidth sharing configuration corresponds to the client device, and allocates the data bandwidth of the sharing device to the client device based on the second data bandwidth sharing configuration indicating the client device does not agree to share its data bandwidth.

7. The data bandwidth management device of claim 6, further comprising:

a data bandwidth monitor, determining if the data bandwidth of the sharing device is congested, wherein the data bandwidth allocator allocates the data bandwidth of the sharing device to the client device based on determination of the data bandwidth of the sharing device is not congested.

8. The data bandwidth management device of claim 6, wherein the first data bandwidth sharing configuration further indicates the sharing device has highest priority to use its data bandwidth, further comprising:

a data bandwidth monitor, monitoring if the sharing device is using its data bandwidth, wherein the data bandwidth allocator allocates data bandwidth of the sharing device to the client device only when the sharing device is not using its data bandwidth.

9. The data bandwidth management device of claim 6, wherein the first data bandwidth sharing configuration further indicates the sharing device has highest priority to use its data bandwidth, and wherein the allocator receives a service request of the sharing device when the client device is using data bandwidth of the sharing device, and stops the client device from using data bandwidth of the sharing device based on the reception of the service request of the sharing device.

10. The data bandwidth management device of claim 6, further comprising:

a data bandwidth monitor, determining if a data bandwidth of the data bandwidth management device is congested, wherein the allocator allocates the data bandwidth of the one or more sharing devices to the client device based on determination of the data bandwidth of the data bandwidth management device is congested.

* * * * *